(12) United States Patent
Shelhart et al.

(10) Patent No.: US 9,079,732 B1
(45) Date of Patent: Jul. 14, 2015

(54) SHEET REGISTRATION USING ORBITAL TAMPERS

(71) Applicant: XEROX Corporation, Norwalk, CT (US)

(72) Inventors: Timothy G. Shelhart, West Henrietta, NY (US); Aaron M. Moore, Fairport, NY (US); Samuel P. Sadtler, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 20 days.

(21) Appl. No.: 14/159,577

(22) Filed: Jan. 21, 2014

(51) Int. Cl.
*B65H 9/10* (2006.01)
*B65H 1/04* (2006.01)
*B65H 11/00* (2006.01)
*B65H 31/38* (2006.01)
*B65H 31/40* (2006.01)
*F16H 37/12* (2006.01)

(52) U.S. Cl.
CPC ............... *B65H 9/101* (2013.01); *B65H 1/04* (2013.01); *B65H 11/00* (2013.01); *B65H 31/38* (2013.01); *B65H 31/40* (2013.01); *F16H 37/122* (2013.01); *B65H 2403/5331* (2013.01); *B65H 2403/5332* (2013.01)

(58) Field of Classification Search
CPC ............ B65H 9/00; B65H 9/10; B65H 9/106; B65H 9/101; B65H 31/34; B65H 31/38; B65H 31/40; B65H 11/00; B65H 2403/481; B65H 2403/50; B65H 2403/51; B65H 2403/511–2403/514; B65H 2403/533; B65H 2403/5331–2403/5333; F16H 37/122
See application file for complete search history.

(56) References Cited

U.S. PATENT DOCUMENTS

| | | | |
|---|---|---|---|
| 2,992,823 A | 7/1961 | Forrester |
| 3,370,848 A | 2/1968 | Bartlett |
| 4,147,342 A | 4/1979 | Naramore |
| 4,844,440 A | 7/1989 | Gray |
| 5,499,808 A | 3/1996 | Nishimoto et al. |
| 6,168,154 B1 | 1/2001 | Asahara et al. |
| 7,562,869 B2 | 7/2009 | Mao et al. |
| 7,658,378 B2 | 2/2010 | Lappok et al. |
| 7,669,847 B2 | 3/2010 | Yamaguchi |

FOREIGN PATENT DOCUMENTS

EP           0970903         12/2000

*Primary Examiner* — Michael McCullough
(74) *Attorney, Agent, or Firm* — Gibb & Riley, LLC (57) ABSTRACT

An exemplary apparatus herein includes a registration item positioned at the end of a shelf. Further, tamper elements contact the sides of sheets of media on the shelf to align them and push them toward the registration item. In addition, a frame element is connected to each of the tamper elements and a biased member is connected to the frame element. A motor is connected to the biased member. Rotation of the motor moves the tamper elements in a closed curve path motion relative to the shelf and the registration item. With increasing speed of the rotation of the motor, the biased member expands, and this increases the distance of the closed curve path motion and increases the force applied by the tamper elements against the sheets of media being moved toward the registration item along the shelf.

20 Claims, 8 Drawing Sheets

SHEET REGISTRATION USING ORBITAL TAMPERS

BACKGROUND

Systems and methods herein generally relate to registration (alignment) of stacks of sheets, and more particularly to tampers to promote registration.

Many modern production devices output sheets of media, such as sheets of paper, transparencies, plastic sheets, ceramic sheets, metallic sheets, etc. These sheets are often output into stacks, and the stacks are more efficiently processed if all the sheets are aligned with each other. For example, many printing devices align a stack of sheets before stapling the stack.

In one example, a printing device may send the lead edge of paper into the throat of a stapler. In front of the staplers, there is commonly a narrow shelf that helps guide the paper into the stapler and that provides support for the front portion of the paper as it begins to accumulate. The majority of the sheet body is then dropped onto the stack of previously compiled sets. The top of the stack, however, should not be located below the narrow shelf and staplers (because this is helpful for ejecting the newly compiled set onto the stack). This height delta can cause sheets to "walk downhill" as the top sheet of the set is tamped, creating angled, poorly registered sets. Furthermore, this height delta grows larger as small stapled sets begin to develop staple build-up.

Additionally, machine vibrations can cause sets of sheets to move away from the registration wall during tamping because there is nothing constraining the set in the process direction. Also, stepper motors can lose step counts due to rapid changes in motion, which result in mistimed and insufficient tamping.

SUMMARY

An exemplary apparatus herein includes a shelf receiving sheets of media. In such an exemplary apparatus, a registration item (e.g., registration wall) is positioned at the end of the shelf. The registration item has a surface approximately perpendicular to the surface of the shelf. The leading edges of the sheets of media are positioned on the shelf and contact, and are aligned against the registration item.

Further, tamper elements are included as part of the apparatus and the tamper elements contact the sides of the sheets of media to align them and push them toward the registration item. Thus, each of the tamper elements has a surface approximately perpendicular to the surface of the shelf and the surface of the registration item. Further, the surface of the tamper elements can have a coefficient of friction at least twice the coefficient of friction of the surface of the shelf, to allow the tampers to effectively move the sheets of media. The surface of each of the opposing tamper elements contacts either the first side edge or the opposing second side edge of the sheets of media. In addition, a frame element is connected to each of the tamper elements and a biased member (e.g., spring, etc.) is connected to the frame element. A motor is connected to the biased member.

The shelf and the registration item are in a fixed position relative to each other. Rotation of the motor moves the tamper elements in a closed curve path motion (e.g., a circle, an ellipse, an oval, etc.) relative to the shelf and the registration item. The closed curve path motion is in a plane parallel to the surface of the shelf and perpendicular to the surface of the registration item. The closed curve path motion moves the tamper elements toward the registration item as the tamper elements contacts the sheets and moves the sheets of media toward the registration item along the shelf. With increasing speed of the rotation of the motor, the biased member expands, and this increases the distance of the closed curve path motion and increases the force applied by the tamper elements against the sheets of media being moved toward the registration item along the shelf.

In other words, the biased member becomes longer with the increasing speed of the rotational movement of the motor and causes the distance of the closed curve path motion to increase with increasing speed of the rotation of the motor. The motor rotates in a single rotational direction.

More specifically, the motor has an output shaft, and operation of the motor causes the output shaft to rotate (termed "rotational movement" of the motor). A planetary item (planetary arm or disk) is connected to the output shaft, and the planetary item has a distal end moving around the output shaft as the output shaft rotates. The apparatus further comprises a pin connected to an outer area (e.g., the distal end) of the planetary item that is rotating around the output shaft. The frame element has an opening, and the pin is positioned within (and rotates within) the opening to connect the frame element to the planetary item. Rotation of the output shaft of the motor moves the planetary item, the pin, and the frame element to cause each the tamper elements to move in the closed curve path motion.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
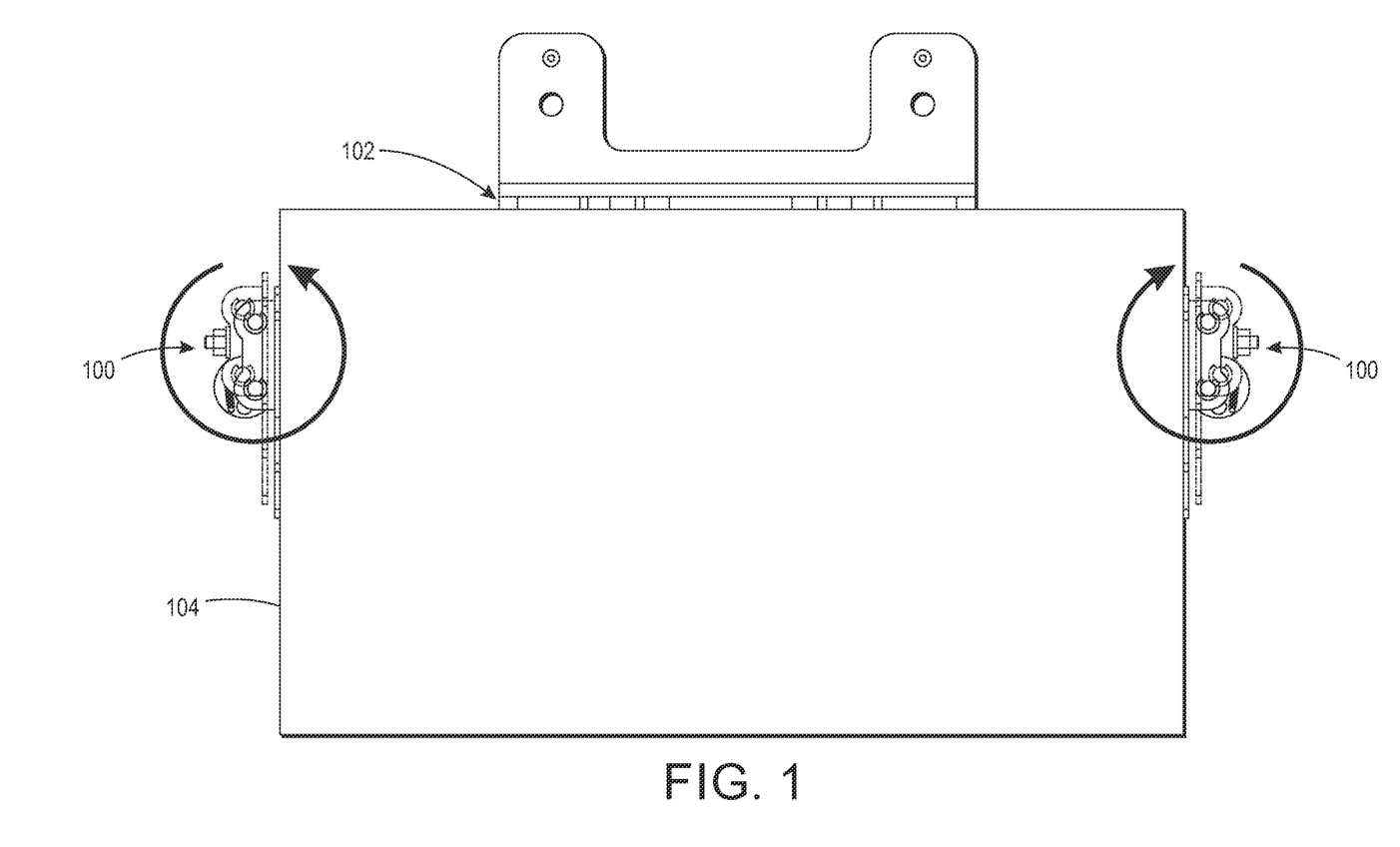
FIG. 1 is a schematic diagram illustrating devices herein.

As mentioned above, it can be difficult to provide proper registration of sheets within a stack. Therefore, as shown schematically in FIGS. 1-4, the devices herein provide two wheeled tampers 100 linked by a bar 126 to provide a constantly rotating surface that remains perpendicular to the registration wall 102. The bar 126 provides a sufficiently large area to tamp the uneven sheets 104, while producing a forward component of motion to the set of sheets 104 (as shown by the curved arrows in FIG. 1) which biases the set 104 towards the registration wall 102. Additionally, these tamping structures 100 allow for continuous tamping with continuous motor rotation without the need to constantly stop and reverse the motor 120 for repeated motor accelerations. Lastly, the tamping bar 126 is mounted on spring loaded secondary eccentrics 124, 130, 132, 134, enabling variable displacement tamping based on the speed of rotation.

Thus, the various devices described herein utilize circular motion (curved arrows in FIG. 1) of the tampers 100 to allow for constant velocity tamping without the need to dynamically change the motor speeds and direction, which eliminates the risk of lost step counts. This provides motion in the process direction to maintain sheet registration and the eccentric pins-spring system 124, 130, 132, 134 allows for the dynamic change of tamper compression distance to the set 104. The devices herein also add the ability to tamp more times per sheet.

Figure 2:
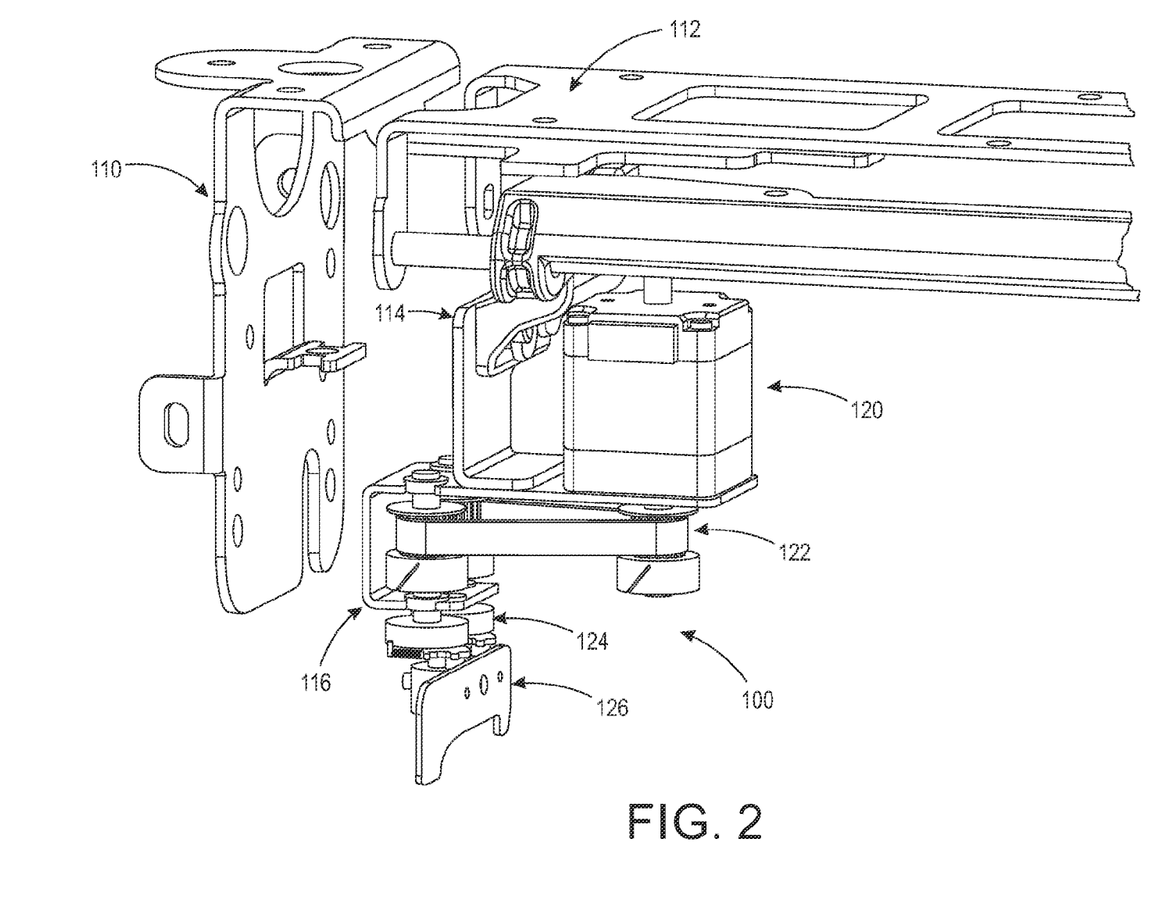
FIG. 2 is a schematic diagram illustrating devices herein.
Figure 3:
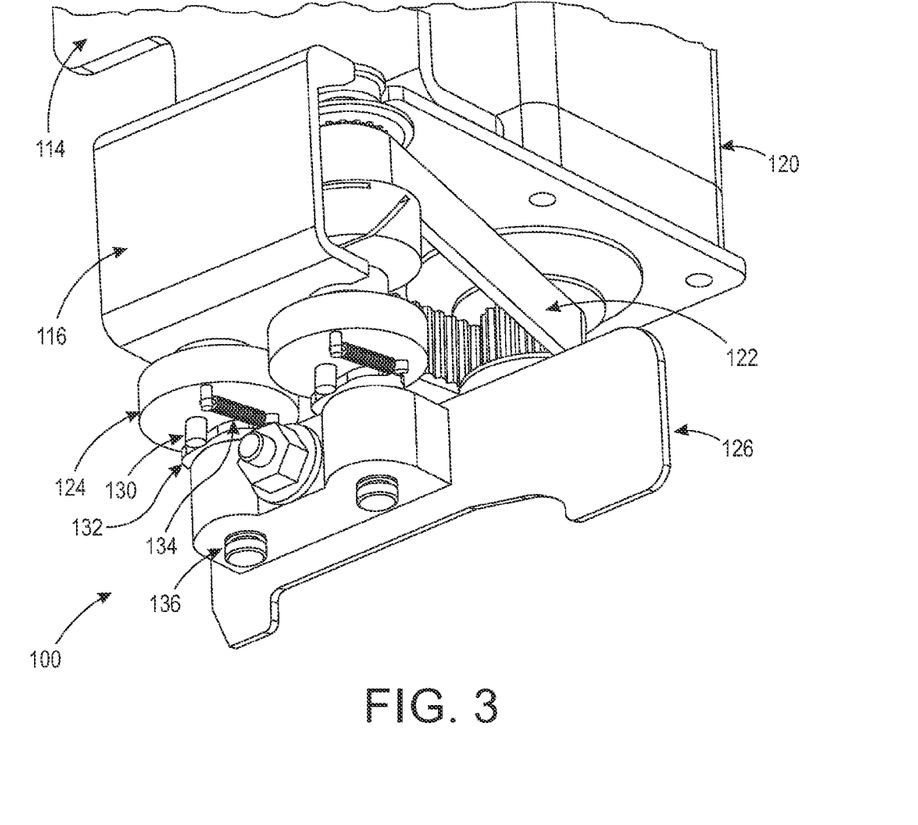
FIG. 3 is a schematic diagram illustrating devices herein.
Figure 4:
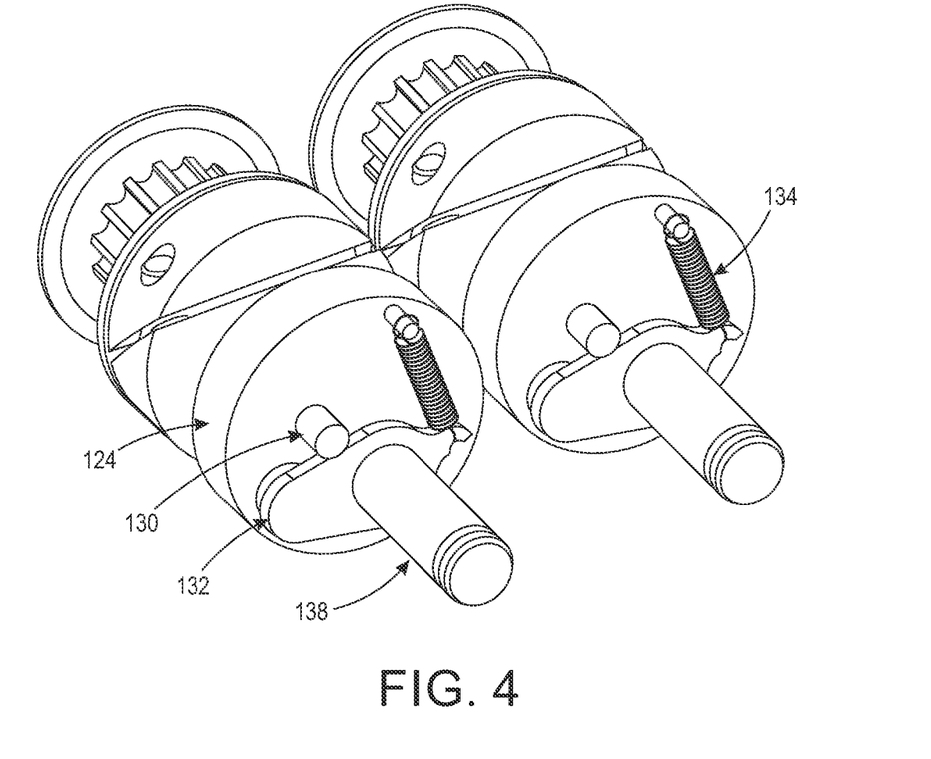
FIG. 4 is a schematic diagram illustrating devices herein.

In one specific example, many frame components 110, 112 114, 116, etc., are shown in FIGS. 2-4. Further, wheels 124 with eccentric pins 138, by which the two wheels 124 are linked (via link 136) are shown. The link 136 syncs the movement of the wheels 124, providing a parallel surface 126 for tamping. Further, this device includes retraction/extension spools 132 on common drive shafts/bearings, tie bars, a stepper motor 120 and drive belt 122, mounting supports 116. With this device, prior to sheets 104 being delivered into the stapler throat, the scuffer slows the sheets and registers the sheets against the registration wall 102. Then, the scuffer lifts and the tampers 100 tamp in the cross-process direction.

With the orbital tamping design shown in the attached drawings, the sheets at the bottom of the set 104 are prevented from sliding away from the registration wall 102, which prevents unwanted shingling. More specifically, shingling can occur because the scuffer lifts off the set during tamping (otherwise, the normal force of the scuffer negates the effects of the tampers) which then allows the sheets to walk backwards, away from the registration wall. With the orbital tamping design shown in the attached drawings, there is a near constant force keeping the sheet 104 against the registration wall 102 while the scuffer is up. While the tampers 100 tamp, they apply forward momentum (arrows, FIG. 1) to the set 104 on the compiler shelf to prevent the sheets from shingling.

Further, the tampers 100 are mounted on, and spring loaded against, the tie bars 126 using springs (or other similar bias members) 134. More specifically, as shown in FIGS. 3 and 4, the bias force exerted by the springs 134 biases the eccentric pins 138 toward the center of the wheels 124. When the springs 134 are fully compressed (in their shortest state) the diameter of the circular path of the wheels 124 will be as small as possible. However, as the motor 120 rotates the wheels 124 faster, the centrifugal force exerted by the wheels 124 increases, which expands the springs 134. This causes the position of the spools 132 to change with respect to the wheels 124, which in turn increases the diameter of the circular path of the wheels 124. As the diameter of the circular path of the wheels 124 increases, the amount that the tamping bar 126 moves also increases and the amount of force exerted by the tamping bar 126 correspondingly increases.

Based on the spring force used to hold the tampers 100, spinning the tampers at faster speeds will cause the tampers to compress the set more and more based on the centrifugal force pulling the tamper away from the spring 134. This is beneficial because if 5 mm of compression is required on either side of the set to register it tightly, performance is improved by tamping 2.5 mm on the first tamp, then the full 5 mm on the second tamp. With this design, the motor velocity can simply increase over the course of 2-3 rotations (equaling 2-3 tamps on the set) with each sequential tamp driving the set 104 closer and closer the full 5 mm of desired compression. This is simpler and more reliable from a controls perspective as no motor reversing is required and there is virtually no risk of losing step count/tamper position.

Also, tamping in an orbital motion (arrows, FIG. 1) maintains registration in both the process and cross-process directions, without the need of tampers on all sides, and variable tamper position based on motor velocity improves tamping performance. These structures create movement in the process direction to maintain sheet registration, and this affects the entire set of sheets to alleviated bottom sheet drift. These structures also provide tamping without the need to have motors change direction equating to simpler, more robust controls strategy. This further allows an increased number of tamps per sheet, and the spring loaded tampers allow for variable tamping compression based on motor velocity.

Figure 5:
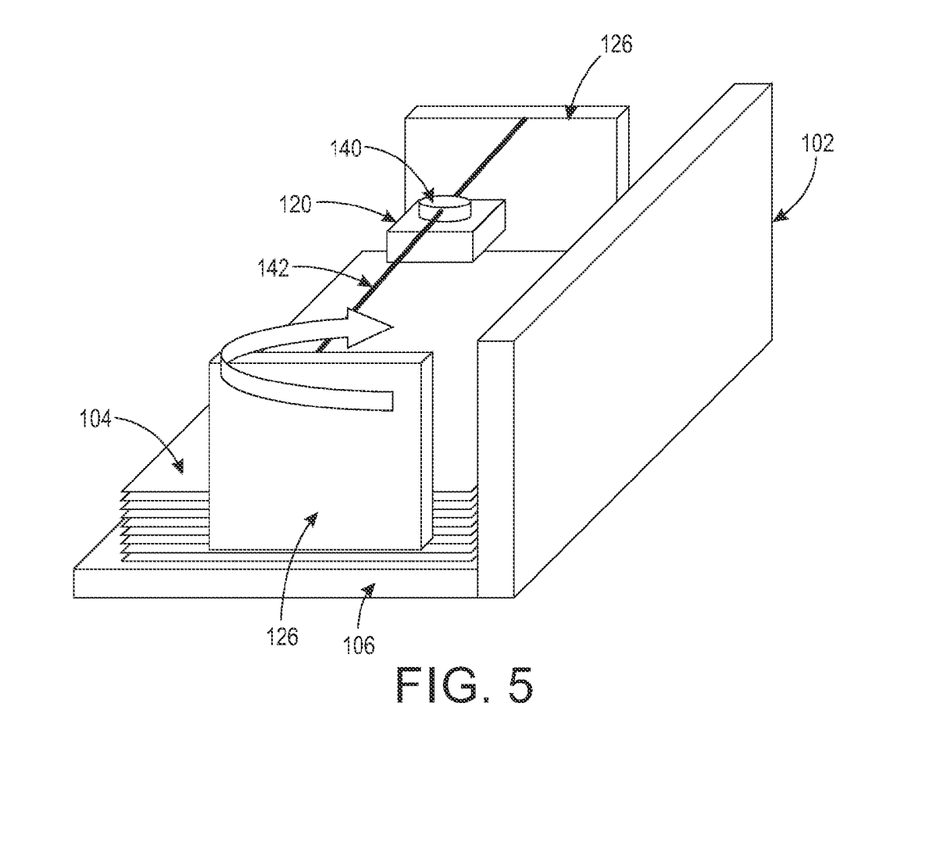
FIG. 5 is a schematic diagram illustrating devices herein.
Figure 6:
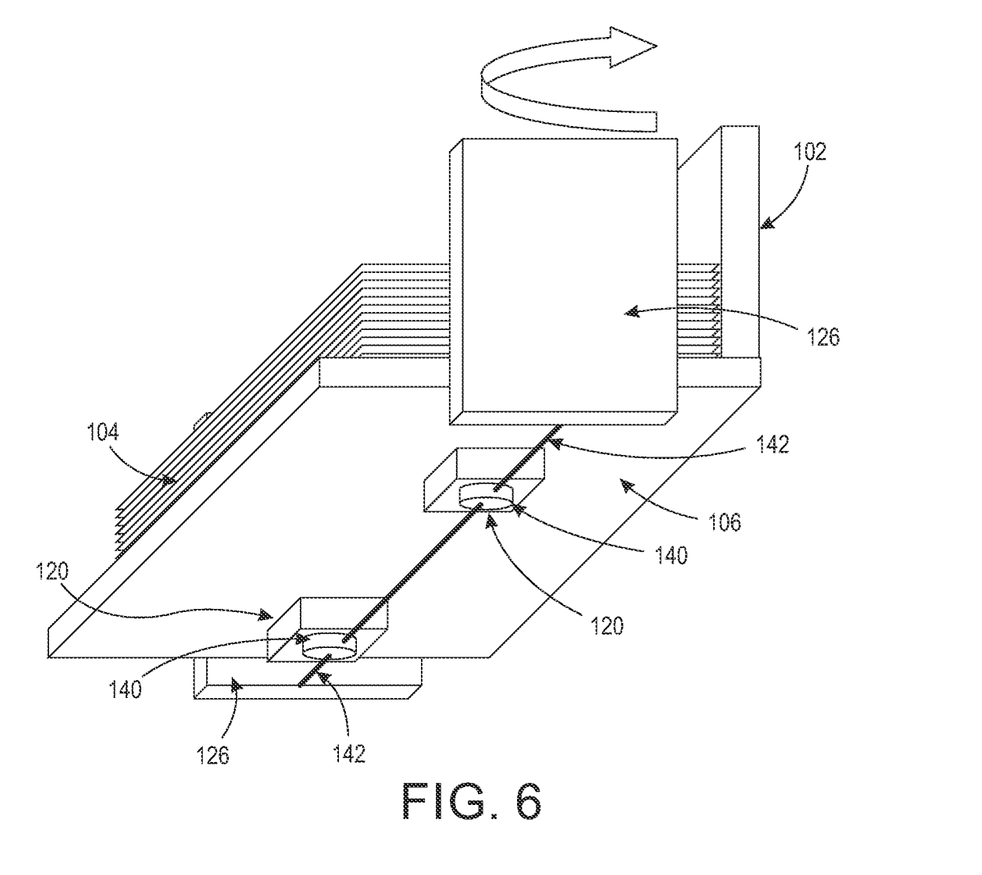
FIG. 6 is a schematic diagram illustrating devices herein.
Figure 7:
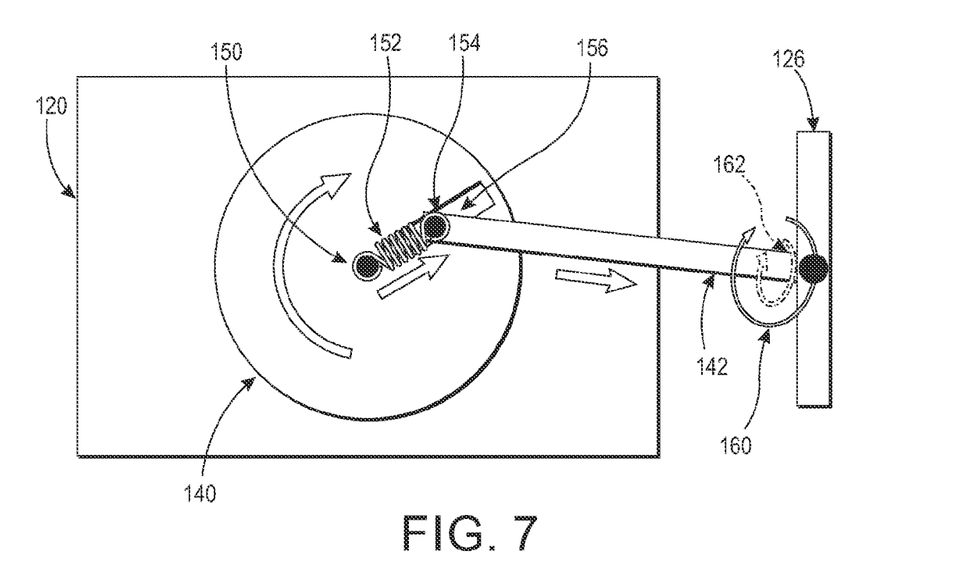
FIG. 7 is a schematic diagram illustrating devices herein.

More generic exemplary apparatuses are shown in FIGS. 5-7. Such structures includes a shelf 106 receiving sheets of media 104. For ease of reference, and as would be understood by those ordinarily skilled in the art, each of the sheets of media 104 is considered to have a sheet front and a sheet back opposing one another, a leading edge and a trailing edge at opposite ends of the sheet front and the sheet back, and a first side edge and a second side edge at opposite sides of the sheet front and the sheet back. Further, the sheet front and the sheet back (the flat portions of sheet) have a greater amount of surface area relative to combined surface areas of the leading edge, the trailing edge, the first side edge, and the second side edge.

In such an exemplary apparatus, a registration item 102 (e.g., registration wall, stapler, etc.) is positioned at the end of the shelf 106. As shown in FIG. 5, for example, the registration item 102 has a surface approximately perpendicular to the surface of the shelf 106. The leading edges of the sheets of media 104 are positioned on the shelf 106 and contact, and are aligned against the registration item 102.

Further, tamper elements 126 are included as part of the apparatus and the tamper elements 126 contact the sides of the sheets of media 104 to align them and push the leading edges of the sheets toward the registration item 102. As also shown in FIG. 5, for example, each of the tamper elements has a surface approximately perpendicular to the surface of the shelf 106 and the surface of the registration item 102. Further, the surface of the tamper elements 126 can optionally have a coefficient of friction at least twice the coefficient of friction of the surface of the shelf 106, to allow the tampers to effectively move the sheets of media 104. Those ordinarily skilled in the art would understand that the coefficient of friction of the tamper elements 126 could be much higher (10 times, 100 times, etc.) coefficient of friction of the surface of the shelf 106. The surface of each of the opposing tamper elements 126 contacts either the first side edge or the opposing second side edge of the sheets of media 104.

In addition, a frame element 142 is connected to each of the tamper elements 126 and a biased member 152 (e.g., spring, etc.) is connected to the frame element 142. A motor 120 is connected to the biased member 152. Further, as shown in FIG. 5, a single motor 120 can be connected to multiple tamper elements 126, or as shown in FIG. 6, a motor 120 can be connected to each tamper element 126. In addition, the tamper structure can be located above the shelf 106 (FIG. 5) or below the shelf 106 (FIG. 6).

As shown in FIG. 7, the motor 120 has an output shaft 150, and operation of the motor 120 causes the output shaft 150 to rotate (termed "rotational movement" of the motor 120). A planetary item 140 (planetary arm, disk, etc.) is connected to the output shaft 150, and the planetary item 140 has a distal end (or circumference) moving around the output shaft 150 as the output shaft 150 rotates. The apparatus further comprises a pin 154 (which can be located within a slot 156 of the planetary item 140). The pin 154 is connected to an outer area (e.g., the distal end) of the planetary item 140 that is rotating around the output shaft 150. The frame element 142 has an opening, and the pin 154 is positioned within (and rotates within) the opening to connect the frame element 142 to the planetary item 140. As shown in FIG. 7, rotation of the output shaft 150 of the motor 120 moves the planetary item 140, the pin 154, and the frame element 142 to cause each the tamper elements 126 to move in the closed curve path motion (e.g., a circle, an ellipse, an oval, etc.) as shown by curved arrows 160, 162 in FIG. 7.

The shelf 106 and the registration item 102 are in a fixed position relative to each other. Rotation of the motor 120 moves the tamper elements 126 in a closed curve path motion 160, 162 relative to the shelf 106 and the registration item 102. The closed curve path motion 160, 162 is in a plane parallel to the surface of the shelf 106 and perpendicular to the surface of the registration item 102. The closed curve path motion 160, 162 moves the tamper elements 126 toward the registration item 102 as the tamper elements 126 contacts the sides of the sheets and moves the leading edges of the sheets of media 104 toward the registration item 102 along the shelf 106 (see arrows in FIG. 1). As shown by the straight arrows in FIG. 7, with increasing speed of the rotation of the motor 120, the biased member 152 expands as a result of increasing centrifugal force, and this increases the distance of the closed curve path motion (increases from path 162 to path 160) and this also increases the force applied by the tamper elements 126 against the sheets of media 104 being moved toward the registration item 102 along the shelf 106.

In other words, the biased member 152 becomes longer with the increasing speed of the rotational movement of the motor 120 as a result of increasing centrifugal force, and this causes the distance of the closed curve path motion to increase with increasing speed of the rotation of the motor 120. As shown, the motor 120 can rotate in a single rotational direction to perform all tamping operations.

Figure 8:
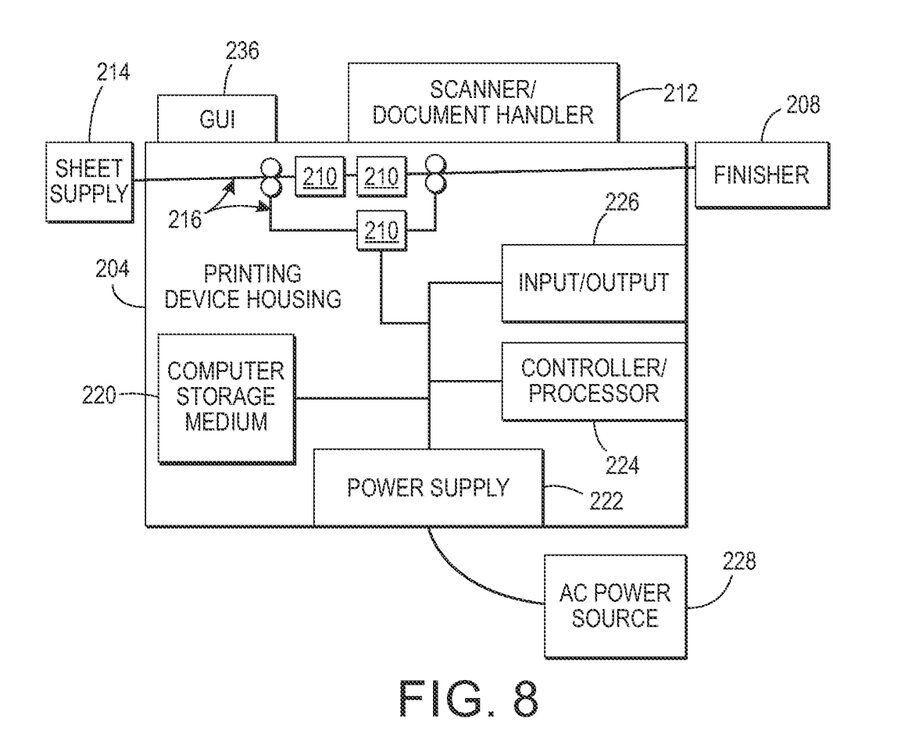
FIG. 8 is a schematic diagram illustrating devices herein.

FIG. 8 illustrates a computerized device that is a printing device 204, which can be used with systems and methods herein and can comprise, for example, a printer, copier, multi-function machine, multi-function device (MFD), etc. The printing device 204 includes a controller/processor 224 and a communications port (input/output) 226 operatively connected to the processor 224 and to the computerized network external to the printing device 204. Also, the printing device 204 can include at least one accessory functional component, such as a graphic user interface assembly 236 that also operate on the power supplied from the external power source 228 (through the power supply 222).

The input/output device 226 is used for communications to and from the printing device 204. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 8, a body housing has one or more functional components that operate on power supplied from an alternating current (AC) source 228 by the power supply 222. The power supply 222 can comprise a power storage element (e.g., a battery, etc).

The printing device 204 includes at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 that includes many of the components mentioned above and shown in FIGS. 1-7, and which can fold, staple, sort, etc., the various printed sheets. Also, the printing device 204 can include at least one accessory functional component (such as a scanner/document handler 212, etc.) that also operates on the power supplied from the external power source 228 (through the power supply 222).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, processors, etc.) are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An apparatus comprising:
a shelf having a surface and an end;

a registration item positioned at said end of said shelf, said registration item having a surface approximately perpendicular to said surface of said shelf;

tamper elements, each of said tamper elements having a surface approximately perpendicular to said surface of said shelf and said surface of said registration item;

a frame element connected to said tamper elements;

a biased member connected to said frame element; and a motor connected to said biased member, rotation of said motor moving said tamper elements in a closed curve path motion relative to said shelf, said closed curve path motion being in a plane parallel to said surface of said shelf, said closed curve path motion moving said tamper elements toward said registration item as said tamper elements move toward each other, and said biased member increasing a distance of said closed curve path motion with increasing speed of said rotation of said motor.

2. The apparatus according to claim 1, said biased member becoming longer with said increasing speed of said rotation of said motor and causing said increasing said distance of said closed curve path motion with increasing speed of said rotation of said motor.

3. The apparatus according to claim 1, said increasing said distance of said closed curve path motion increasing force applied by said tamper elements against workpieces being moved toward said registration item along said shelf.

4. The apparatus according to claim 1, said rotation of said motor comprising rotation in a single rotational direction.

5. The apparatus according to claim 1, said motor comprising an output shaft, said apparatus further comprising a planetary item connected to said output shaft, operation of said motor causing said output shaft to rotate and comprising said rotation of said motor, said planetary item having a distal end rotating around said output shaft as said output shaft rotates, said apparatus further comprising a pin connected to said distal end of said planetary item, said frame element comprising an opening, said pin being positioned within and rotating within said opening, each rotation of said output shaft of said motor moving said planetary item, said pin, and said frame element to cause each said tamper elements to move in said closed curve path motion.

6. The apparatus according to claim 1, said tamper elements having a coefficient of friction at least twice a coefficient of friction of said surface of said shelf.

7. The apparatus according to claim 1, said closed curve path motion comprising one of a circle, an ellipse, and an oval.

8. An apparatus comprising:

a shelf having a surface and an end, said shelf receiving sheets of media;

a registration item positioned at said end of said shelf, said registration item having a surface approximately perpendicular to said surface of said shelf, said sheets of media positioned on said shelf contacting and being aligned against said registration item;

tamper elements, each of said tamper elements having a surface approximately perpendicular to said surface of said shelf and said surface of said registration item, and said surface of said tamper elements contacting said sheets of media;

a frame element connected to said tamper elements;

a biased member connected to said frame element; and a motor connected to said biased member, rotation of said motor moving said tamper elements in a closed curve path motion relative to said shelf, said closed curve path motion being in a plane parallel to said surface of said shelf and perpendicular to said surface of said registration item, said closed curve path motion moving said tamper elements toward said registration item as said tamper elements contact said sheets of media and move said sheets of media toward said registration item along said shelf, and said biased member increasing a distance of said closed curve path motion with increasing speed of said rotation of said motor.

9. The apparatus according to claim 8, said biased member becoming longer with said increasing speed of said rotation of said motor and causing said increasing said distance of said closed curve path motion with increasing speed of said rotation of said motor.

10. The apparatus according to claim 8, said increasing said distance of said closed curve path motion increasing force applied by said tamper elements against said sheets of media being moved toward said registration item along said shelf.

11. The apparatus according to claim 8, said rotation of said motor comprising rotation in a single rotational direction.

12. The apparatus according to claim 8, said motor comprising an output shaft, said apparatus further comprising a planetary item connected to said output shaft, operation of said motor causing said output shaft to rotate and comprising said rotation of said motor, said planetary item having a distal end rotating around said output shaft as said output shaft rotates, said apparatus further comprising a pin connected to said distal end of said planetary item, said frame element comprising an opening, said pin being positioned within and rotating within said opening, each rotation of said output shaft of said motor moving said planetary item, said pin, and said frame element to cause each said tamper elements to move in said closed curve path motion.

13. The apparatus according to claim 8, said tamper elements having a coefficient of friction at least twice a coefficient of friction of said surface of said shelf.

14. The apparatus according to claim 8, said closed curve path motion comprising one of a circle, an ellipse, and an oval.

15. An apparatus comprising:

a shelf having a surface and an end, said shelf receiving sheets of media, each of said sheets of media comprising:

a sheet front and a sheet back opposing one another;

a leading edge and a trailing edge at opposite ends of said sheet front and said sheet back; and a first side edge and a second side edge at opposite sides of said sheet front and said sheet back, said sheet front and said sheet back comprising a greater amount of surface area of each of said sheets of media relative to combined surface areas of said leading edge, said trailing edge, said first side edge and said second side edge;

a registration item positioned at said end of said shelf, said registration item having a surface approximately perpendicular to said surface of said shelf, said leading edge of said sheets of media positioned on said shelf contacting and being aligned against said registration item;

tamper elements, each of said tamper elements having a surface approximately perpendicular to said surface of said shelf and said surface of said registration item, and said surface of said tamper elements contacting one of said first side edge and said second side edge said sheets of media;

a frame element connected to said tamper elements;

a biased member connected to said frame element; and a motor connected to said biased member, said shelf and said registration item being in a fixed position relative to each other, rotation of said motor moving said tamper elements in a closed curve path motion relative to said shelf and said registration item, said closed curve path motion being in a plane parallel to said surface of said shelf and perpendicular to said surface of said registration item, said closed curve path motion moving said tamper elements toward said registration item as said tamper elements contacts said sheets and move said sheets of media toward said registration item along said shelf, and said biased member increasing a distance of said closed curve path motion and increasing force applied by said tamper elements against said sheets of media being moved toward said registration item along said shelf with increasing speed of said rotation of said motor.

16. The apparatus according to claim 15, said biased member becoming longer with said increasing speed of said rotation of said motor and causing said increasing said distance of said closed curve path motion with increasing speed of said rotation of said motor.

17. The apparatus according to claim 15, said rotation of said motor comprising rotation in a single rotational direction.

18. The apparatus according to claim 15, said motor comprising an output shaft, said apparatus further comprising a planetary item connected to said output shaft, operation of said motor causing said output shaft to rotate and comprising said rotation of said motor, said planetary item having a distal end rotating around said output shaft as said output shaft rotates, said apparatus further comprising a pin connected to said distal end of said planetary item, said frame element comprising an opening, said pin being positioned within and rotating within said opening, each rotation of said output shaft of said motor moving said planetary item, said pin, and said frame element to cause each said tamper elements to move in said closed curve path motion.

19. The apparatus according to claim 15, said tamper elements having a coefficient of friction at least twice a coefficient of friction of said surface of said shelf.

20. The apparatus according to claim 15, said closed curve path motion comprising one of a circle, an ellipse, and an oval.

* * * * *